INVENTOR
RAYMOND LAPRAND

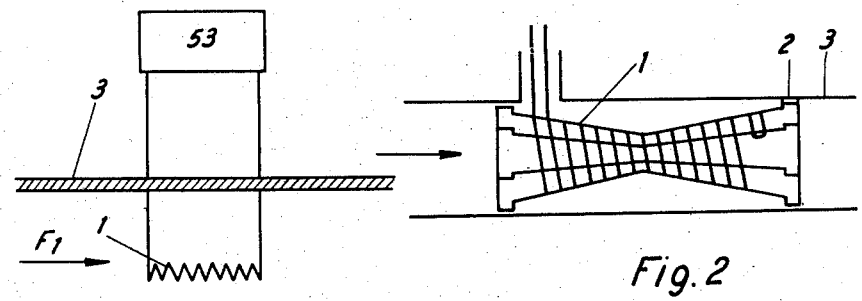
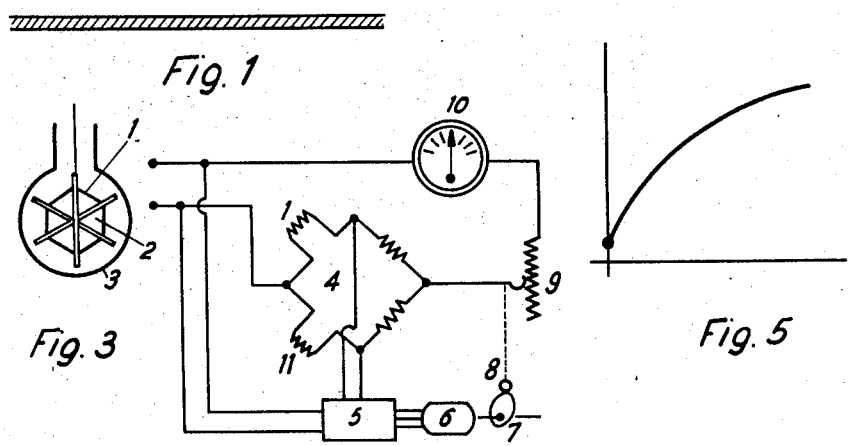
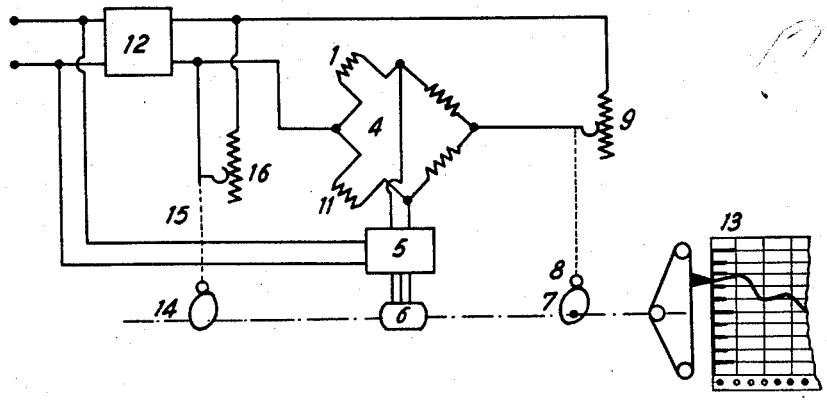

United States Patent Office 2,892,347
Patented June 30, 1959

2,892,347

INSTRUMENT FOR MEASURING THE FLOW OF A FLUID

Raymond Laprand, Paris, France, assignor to l'Air Liquide, Societe Anonyme pour l'Etude et l'Exploitation des Procedes Georges Claude, Paris, France Application February 16, 1955, Serial No. 488,557

Claims priority, application France February 19, 1954

1 Claim. (Cl. 73—204)

My invention relates to electric measuring instruments serving for the automatic indication, recording, adjusting and totalizing or metering of the flow of a fluid.

Instruments of this type are already known, wherein a heating element, say an electric resistance heated by the current passing through it, is housed inside the channel conveying the fluid of which the flow is to be measured.

The temperature assumed by the heating element depends then both on the speed of the fluid and on the power applied to the heating of said resistance or the like element.

When it is desired to measure the flow of a fluid, the temperature assumed by the heating element or by an auxiliary element with reference to the temperature of the fluid is kept at a constant value by acting on the current flowing through the heating element; the intensity of the electric current thus adjusted provides a measure of the flow of the fluid.

My invention has more particularly for its object various improvements in such measuring instruments.

Its primary object is a measuring instrument incorporating an electric resistance the value of which varies with the temperature and which is mounted in the channel feeding the fluid so as to be submitted to the heat transmitted to it by the electric current through said resistance and to the cooling produced by the flow of fluid, said resistance being associated with means for adjusting automatically the value of the heating current in a manner such that the difference in temperature between the variable electric resistance and the fluid may be held constant, the intensity of said current forming a measure of the flow of fluid; now, according to my invention, a prime mover controlled by the modifications in the variable electric resistance controls a member adjusting the intensity of the current passing through said resistance so as to keep it at a constant temperature or else so as to keep the difference in temperature between the resistance and the fluid at a constant value, the current measured by a measuring instrument depending thus on the flow of fluid; according to a further feature of my invention, a voltage regulator ensures the stabilization of the measuring means whereby it provides, for a predetermined position of the member adjusting the heating current, a single well-defined value for the difference in temperature between the electric resistance and the fluid.

My invention also has for its object a measuring instrument of the type disclosed wherein an auxiliary current is controlled by an adjusting member controlled in its turn by the driving member or prime mover in a manner such that the instantaneous value of said auxiliary current may depend on the instantaneous value of the flow, said auxiliary current feeding a totalizer giving out an indication or a graphic record of the amount of fluid conveyed.

According to a particular embodiment of my invention, the means adjusting the current are constituted by rheostats the sliding elements of which are controlled by the prime mover.

In a still further embodiment, the means adjusting the intensity of the current are constituted by induction coils provided with an iron core and the values of which are adjusted by an auxiliary saturating coil fed with a current which is in its turn controlled by a rheostat controlled by the prime mover. This arrangement allows reducing the bulk of the rheostat and consequently the power produced by the prime mover for the actuation of the said rheostat.

According to a still further embodiment, the means adjusting the intensity of current are constituted by transformers having a movable core or armature while the position of the magnetic circuit adjusting the value of the auxiliary current is controlled by the prime mover.

According to a further object of my invention, the instrument for measuring the flow of a fluid includes in combination an element sensitive to the flow of fluid, an element sensitive to the temperature of the fluid, said elements acting differentially, through a Wheatstone bridge and in accordance with the above disclosure, on the iron core or armature of the transformer, which leads consequently to a modification in the secondary current which, when rectified, controls the means adjusting the heating current flowing through the Wheatstone bridge and, consequently, the electric power transformed into heat by the first sensitive resistance with a view to measuring the flow of fluid.

According to a preferred embodiment, the meter totalizing the flow of fluid includes four arrangements, to wit, an arrangement for measuring a function $K_1I^2$ of the heating current, a second arrangement measuring a function $K_2I$ of this said heating current, a third arrangement defining a constant action $Ko$ and a fourth arrangement defining a variable action V adapted to produce the desired correction required for obtaining finally on the meter accurate indications.

According to a further object of my invention, the measuring instrument incorporating one or more of the above features provides for the passage of the electric heating current through a purely heating resistance inserted between two resistances sensitive to the temperature of the fluid, the resistance inserted on the downstream side of the heating resistance being furthermore sensitive to the heat transmitted to the fluid by the first purely heating resistance, while adjusting means act on the heating current so as to keep automatically constant the difference in temperature between said two resistances sensitive to the temperature of the fluid.

According to a further object of my invention, the measuring instrument includes several Wheatstone bridges the number of which is equal to the number of outputs to be measured and including each, as disclosed hereinabove, an element sensitive to the flow and an element sensitive to the temperature of the fluid, said Wheatstone bridges being fed in succession in time and being connected in succession with the detecting and amplifying means in a manner such that the successive measuring currents fed to the measuring instrument through said detecting and amplifying means provide the successive indications of the flows in the different circuits to be considered, said arrangement allowing a single measuring instrument to be used for ascertaining the value of a plurality of flows.

My invention has further for its object an apparatus for measuring the flow of a fluid, including a Wheatstone bridge provided as disclosed with resistances sensitive to the flows and inserted in series in the different channels together with resistances sensitive to the temperature, inserted also in series in the different channels so that said Wheatstone bridge may feed into the detecting and amplifying means a current which is thus a function of the sum of the flows in the different channels.

My invention covers also a heating resistance sensitive to the temperature and constituted by a conductive wire wound over an insulating carrier provided with ports for the passage of the fluid, said arrangement allowing an improvement in the contact between the fluid and the resistance and a reduction in the thermic inertia.

In a particular embodiment, the insulating carrier has the shape of a double frusto-cone the smaller bases of which engage each other, whereby the sensitive heating wire provides a measure which is independent of the distribution of the speeds at which the fluid flows at the different points of the cross-section of the channel.

Means for measuring the flow of a fluid according to my invention are illustrated by way of examples in the accompanying drawings wherein:

Fig. 1 is a diagrammatic illustration of the principle of the instruments to which my invention is applicable;

Figs. 2 and 3 are a vertical elevational and a sectional view of an embodiment of an electric resistance sensitive to the flow of fluid.

Fig. 4 illustrates diagrammatically an embodiment of the instrument measuring the flow of a fluid;

Fig. 5 is a graph showing the curve defining the heating intensity flowing through the sensitive resistance as a function of the flow of fluid;

Fig. 6 illustrates diagrammatically an embodiment of the arrangement producing a movement of the measuring member which is proportional to the flow;

Figure 7:
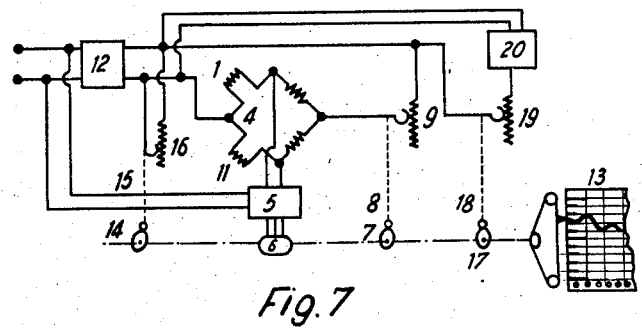
Figs. 7 and 8 illustrate diagrammatically two embodiments of instruments wherein an auxiliary current is brought to a value which is proportional to the flow of fluid.

Turning to Fig. 1, the instrument measuring the flow of fluids consists in an electric resistance 1 the value of which varies with the temperature, said resistance housed inside the channel 3 conveying any desired fluid being fed with an electric current, which has for its result an increase in the temperature of the resistance with reference to that of the fluid. On the other hand, said variable resistance is also submitted to the cooling action of the fluid progressing for instance in the direction of the arrow $F_1$, said cooling action being all the more important when the speed of the fluid is greater. For a predetermined speed of the fluid, the cooling of the variable electric resistance 1 provides for equilibrium with the calories evolved through a Joule effect under the action of the passage of the electric current inside the resistance. The flow of fluid is measured by providing a modification in the power of the electric heating current fed by the electric supply the output of which is adjustable. Said power is measured when equilibrium is actually reached for a predetermined difference in temperature between the temperature of the variable electric resistance 1 and the temperature of the fluid.

The measuring instrument includes thus: a heating resistance submitted to the fluid stream and varying with the temperature. A measuring device acting automatically on the output of the electric supply 53 so as to maintain a predetermined value for the difference in temperature between said resistance and the fluid.

The electrically heated resistance submitted to the action of the speed of the fluid is constituted as shown in Figs. 2 and 3 by a wire of pure platinum having a thermic inertia as low as possible and wound over a perforated insulating carrier 2 located inside the channel 3 conveying the fluid of which the flow is to be measured. It is also possible to use for this purpose any other wire the resistance of which varies with temperature such as nickel, copper, iron or the like. The insulating carrier 2 may be made of mica, steatite, or the like insulating material, the shape of said perforated carrier being irrelevant. A winding which allows making the measure independent of the distribution of the speeds of flow of the fluid at different points of the cross-section of the channel is to be preferred and this is the case of the double frusto-cone illustrated by way of example.

It is also possible to use for the temperature-sensitive resistance 1 agglomerated semi-conductive metal oxides having a negative temperature coefficient, such resistances being generally termed thermistances or thermistors, the measuring instruments used being independent of the direction of modification of the resistance for varying temperatures and of the material used for the latter.

The arrangements measuring the difference in temperature and acting on the output of the electric supply are constituted in any of the following manners for instance:

In the arrangement illustrated in Fig. 4, the resistance 1 submitted to the flow of fluid is inserted in a Wheatstone bridge 4 which allows comparing the actual value of said resistance with a reference value. In the diagonal of the Wheatstone bridge is inserted a detecting arrangement such as an amplifier 5 of an electronic type, said detecting arrangement feeding a motor 6 adapted to rotate in both directions; said motor drives through a cam 7 and a lever 8 the sliding element of an adjustable rheostat 9 acting on the power of the electric current flowing through the Wheatstone bridge and consequently on the electric power dissipated as heat in the flow sensitive resistance 1. Obviously, the motor 6 may act on the cam 7 either directly or through the agency of a speed reducer.

The operation is as follows; the flow sensitive resistance 1 submitted to the action of the heating current passing through it and of the cooling fluid assumes a certain equilibrium temperature $Tr$ which is higher than the temperature $Tf$ of the fluid. The values of the three other resistances of the Wheatstone bridge are defined in a manner such that equilibrium is obtained for a value of the resistance 1 corresponding to a difference in temperature $Tr-Tf$ equal to say 20° C. If the flow of fluid increases, the temperature sensitive resistance 1 assumes a temperature lower than $Tr$, its electric resistance decreases and this produces a modification in the balance of the bridge so that current passes through the amplifying and detecting means 5. The latter feeds in a suitable direction the motor 6 which revolves and acts on the rheostat 9 until the current flowing through the sensitive resistance 1 assumes a different value for which the difference in temperature $Tr-Tf$ returns to the predetermined value 20° C. The reading of the current intensity on the ammeter 10 gives out a value of the fluid flow.

This arrangement is suitable when the fluid flows at a predetermined constant temperature. However, generally speaking, the temperature of the fluid is not constant and its variations have an action on the measure; in order to eliminate this drawback, I insert in the fluid-conveying channel a further element 11 which is sensitive solely to the temperature of the fluid and said element forms one of the arms of the Wheatstone bridge, whereby at any moment the difference in temperature $Tr-Tf$ is held at a predetermined value whatever may be the temperature $Tf$ of the fluid.

The ammeter 10 may be of an indicating or of a recording type and it may include if required regulating means whereby it is possible to control the flow of fluid and to bring it to the desired value.

The intensity of current measured by the ammeter 10 is not a linear function of the flow of fluid and its value is not equal to zero when the flow of fluid is zero. Fig. 5 shows the curve defining the intensities as a function of the flow of fluid. It is possible to provide an ammeter with a zero by means of an abutment or through differential action and to feed same with an auxiliary current, the zero current intensity corresponding to a fluid flow which is also at zero, the scale of said ammeter being linear with reference to the flow.

In a further arrangement according to my invention, a scale of readings which is proportional to the flow of fluid may be obtained as illustrated in Fig. 6 by giving the cam 7 a suitable shape so that the rotation of the motor 6 may be proportional to the flow. This is however possible only if the voltage feeding the Wheatstone bridge is stabilized. To this end, I resort to a voltage stabilizer 12, whereby it is possible to obtain a well-defined position for the movable sliding element on the rheostat 9 for a predetermined value of the intensity of current flowing in the bridge and consequently for a predetermined value of the fluid flow. The cam 7 has an outline such that it is possible to obtain for any variation in the flow a proportional rotation of the motor 6. Said motor serves then for the control through any suitable means, such as a gearing, a worm-gear, pulleys and cables or the like, of a recording member cooperating with a chart 15 the scale of which is proportional to the flow. If required, another cam 14 controlling a rheostat 16 through the agency of a lever 15 allows keeping at a constant value the load on the voltage stabilizer 12. This arrangement for recording the flow of a fluid may also include any suitable regulating means for controlling the flow of fluid and returning it to a predetermined desired value.

The above-disclosed arrangements are of particular interest in the case of recording means which may thus provide a planimetric chart with a view to obtaining the total flow during a predetermined period.

In numerous cases, it is of interest to obtain directly on a meter the total fluid flow. This result is obtained by substituting for the ammeter 10 an electric meter incorporating a second differential system through which an auxiliary current flows which corresponds to the zero value of the fluid flow.

A further arrangement according to my invention is illustrated in Fig. 7 and allows obtaining accurately the total flow of fluid. In addition to the parts disclosed with reference to the preceding disclosure which allow bringing the motor 6 into a predetermined position for each flow value, there is fitted over the shaft of the motor a third cam 17 actuating through the agency of a lever 18 the sliding element on a rheostat 19 so as to adjust an auxiliary current feeding the meter 20. The cam 17 having a suitable outline, this allows the meter 20 to provide indications which are proportional to the amount of fluid which has flowed through the channel. The auxiliary current which is proportional to the flow of fluid may also act at a distance on recording means the scale of which is linear with reference to said flow.

It is also possible to resort to an electric meter incorporating differential means fed respectively by the current flowing through the Wheatstone bridge and by the auxiliary current adjusted to an adequate value by the rheostat 19 as provided by the suitable outline given to the cam 17.

My invention covers also, generally speaking, the arrangements of the type disclosed hereinabove and illustrated in Figs. 4, 6 and 7, whatever may be the actual means used therewith for detection and amplification and for adjustment of the current intensities and voltages. In particular the amplifying and detecting means 5 may be constituted by an electronic tube amplifier, a magnetic amplifier or a mirror galvanometer associated with a source of light and with photocells or again a galvanometer provided with instantaneously and periodically acting contact pieces, a highly sensitive relay or any other suitable means adapted to detect the state of equilibrium of a Wheatstone bridge and to make the motor 6 revolve in the desired direction.

Similarly, it is possible to provide adjustable rheostats 9, 16 and 19 with a resistance wire having a varying cross-section so as to increase the length of travel allowed for the sliding element of the rheostat and the sensitivity in the range of high fluid flows. It is also possible to resort to any other known means for adjusting the current intensity or voltage, such as an induction coil having an adjustable core or an induction coil associated with an auxiliary variable magnetizing current or again a transformer having adjustable tappings or a transformer incorporating an adjustable core or armature.

Figure 8:
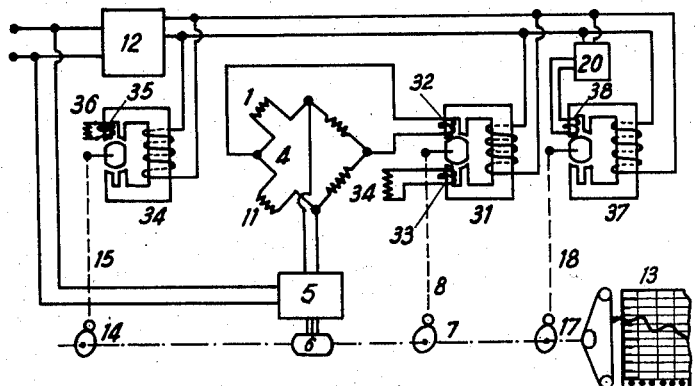

Fig. 8 illustrates a modification in the means for recording or metering the flow of a fluid resorting, to transformers with adjustable cores or pole-pieces, said type of transformer being selected so as to require only a very slight effort for its control. This arrangement includes an element 1 sensitive to the flow of fluid, an element 11 sensitive to the temperature of the fluid, detecting and amplifying means 5 and a motor 6. The cam 7 acting on the movable core of the transformer 31 modifies the voltage of the secondary winding 32 of the transformer and consequently the current passing through the Wheatstone bridge is brought automatically to the desired value whereby the balance of the bridge is restored. The movement of the movable core or armature of the transformer 31 also modifies in a direction opposed to the modification in the voltage feeding the secondary 32, the voltage of the other secondary 33 which feeds a resistance 34 equivalent to that forming the Wheatstone bridge. Consequently the total power absorbed by the transformer 31 varies but little. If required, the load on the voltage stabilizer 12 may be kept at a perfectly constant value through the operation of the cam 14 which has a suitable outline and which acts through the agency of the lever 15 on the movable core of the transformer 34 of which the secondary 35 feeds a resistance 36 while its primary is shunted across the terminals of the stabilizer.

Similarly, the action of the cam 17 on the movable core of the transformer 37 modifies the voltage across the secondary 38 of said transformer and consequently the value of the auxiliary current feeding the meter 20 the indications of which are proportional to the output of fluid as provided by a suitable outline given to the cam 17. The use of transformers with a variable armature allows for the elimination of all movable contact-pieces.

Turning now to Fig. 5 which is a graph showing the curve of the heating intensity I as a function of the fluid flow, it is found that the flow Q is an algebraic function:

$$Q = K_1 I^2 + K_2 I + K_0 + V$$

$K_0$ being a constant and $V$ a variable correcting factor. Practice allows ascertaining that the sum of the three first terms leads to a result which is very near to truth while the variable correction factor $V$ has a very small relative value.

Obviously such a meter provided with multiple control coils of which some are fed by the actual heating current may also be incorporated into the precedingly described arrangement illustrated in Figs. 4, 6, 7, and 8.

The measuring systems described hereinabove and including a temperature sensitive resistance 1 positioned inside the fluid-conveying channel and the heating current flowing through which is adjusted automatically so as to keep at a constant value the difference in temperature between the resistance and the fluid are highly efficient and lead to satisfactory results. However, in each arrangement, it is also possible to substitute for said resistance two separate elements of which one is heated and the other is sensitive to the heat transmitted to the fluid while the current heating the first element is automatically adjusted so as to keep constant the difference in temperature between the second element and the fluid. By resorting to means similar to those disclosed hereinabove it is possible to produce fluid output indicating, recording, regulating and/or metering instruments.

Figure 9:
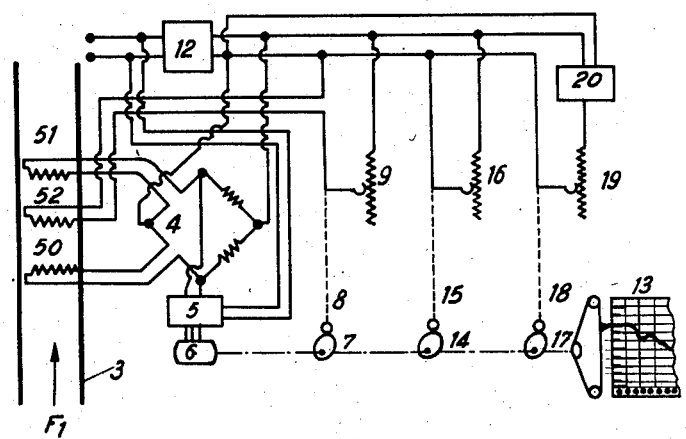
Fig. 9 illustrates diagrammatically a further embodiment incorporating a heating resistance housed inside the fluid conveying channel and inserted between two temperature sensitive resistances.

Fig. 9 illustrates by way of an example such a modification intended for the recording and the metering of a fluid flow. Two temperature sensitive resistances 50 and 51 are positioned inside the fluid-conveying channel to either side of a purely heating resistance 52. The latter heats the fluid as the latter passes over it and the temperature sensitive resistance 51 located on the downstream side of the heating resistance 52 is brought to a temperature higher than that of the fluid i.e. than that of the temperature sensitive resistance 50. If it is attempted to keep this difference in temperature constant, it is necessary to dissipate inside the purely heating resistance 52 a power which is all the larger when the flow of fluid increases and it is possible to measure said flow of fluid by measuring the current heating the resistance 52 to the extent required for keeping the difference in temperature between the two temperature-sensitive resistances 50 and 51 equal to a predetermined value.

The temperature-sensitive resistances 50 and 51 are inserted in two arms of the Wheatstone bridge of which the other arms or resistances are adjusted to values such that the bridge is balanced for a predetermined difference in temperature between the temperature-sensitive elements 50 and 51. When the Wheatstone bridge is no longer balanced, current passes through the amplifying and detecting means 5 which feed in a suitable direction the motor 6 so as to make the latter revolve and act through the cam 7 and the lever 8 on the slider of the rheostat 9, which produces an increase or a reduction in the current passing through the heating resistance 52 until balance is restored in the bridge. It is possible, by providing a constant feeding voltage through the stabilizer 12, to obtain a well-defined position for the movable slider of the rheostat 9 for each well-defined value of the current flowing through said heating resistance 52 and consequently also for each predetermined value of the fluid flow. By giving the cam 7 a suitable outline which makes the motor 6 rotate proportionally to the flow, it is possible to use the shaft of said motor for the control of means recording the flow on the chart 13 the scale of which is linear with reference to the flows.

On the other hand, a suitably shaped cam 17 is also actuated by the motor 6 so as to adjust through the agency of the lever 18 the position of the slider on the rheostat 19 with a view to adjusting correspondingly an auxiliary current feeding the meter 20 the indications given by which are proportional to the flow. A third cam 14 acts through the agency of the lever 15 on the rheostat 16 so as to hold if required the load of the voltage stabilizer 12 at a constant value.

Obviously, in the arrangement which has just been described, it is possible to substitute for the rheostats any other means for adjusting the electric currents and chiefly I may resort to an auxiliary saturating coil as disclosed with transformers having an adjustable iron core or armature as illustrated in Fig. 8.

My invention also covers systems adapted to measure in succession the different flows in a number of channels by resorting to an indicating and/or recording or measuring instrument of any of the above disclosed types.

What I claim is:

In an arrangement for measuring the flow of a fluid in a fluid conveying channel, a Wheatstone bridge having input and output circuits and including at least an electric resistance variable with temperature, positioned inside said channel in condition of temperature exchange with said fluid, a source of electric current connected to the input to said bridge, a voltage stabilizer operatively connected with said source, a transformer provided with an adjustable core for controlling the current intensity applied to the bridge, a first rotating cam for operating said transformer, a second transformer provided with an adjustable core for keeping constant the load on said stabilizer, a second cam for operating said second transformer, a third transformer provided with an adjustable core for controlling the current through a meter from the voltage stabilizer, a third cam for operating said third transformer, an electric motor adapted to rotate said cams, means for controlling said motor from the voltage detected at the output of the Wheatstone bridge, and means for indicating from the rotation of said motor the value of the fluid flow to be measured.

References Cited in the file of this patent

UNITED STATES PATENTS

| | | |
|---|---|---|
| 1,691,600 | Brush et al. | Nov. 13, 1928 |
| 2,362,661 | Peters | Nov. 14, 1944 |
| 2,552,017 | Schwartz et al. | May 8, 1951 |
| 2,650,496 | Middleton et al. | Sept. 1, 1953 |